(No Model.)  3 Sheets—Sheet 1.

J. L. LÖB, G. H. BARLOW & A. W. R. DRABSCH.
BICYCLE DRIVING GEAR.

No. 599,106. Patented Feb. 15, 1898.

Attest
Walter Donaldson
C. S. Middleton

Inventors
Jacob L. Löb
Geo. H. Barlow
Adolph W. R. Drabsch
by Richard & Co. Attys.

(No Model.) 3 Sheets—Sheet 2.
J. L. LÖB, G. H. BARLOW & A. W. R. DRABSCH.
BICYCLE DRIVING GEAR.
No. 599,106. Patented Feb. 15, 1898.
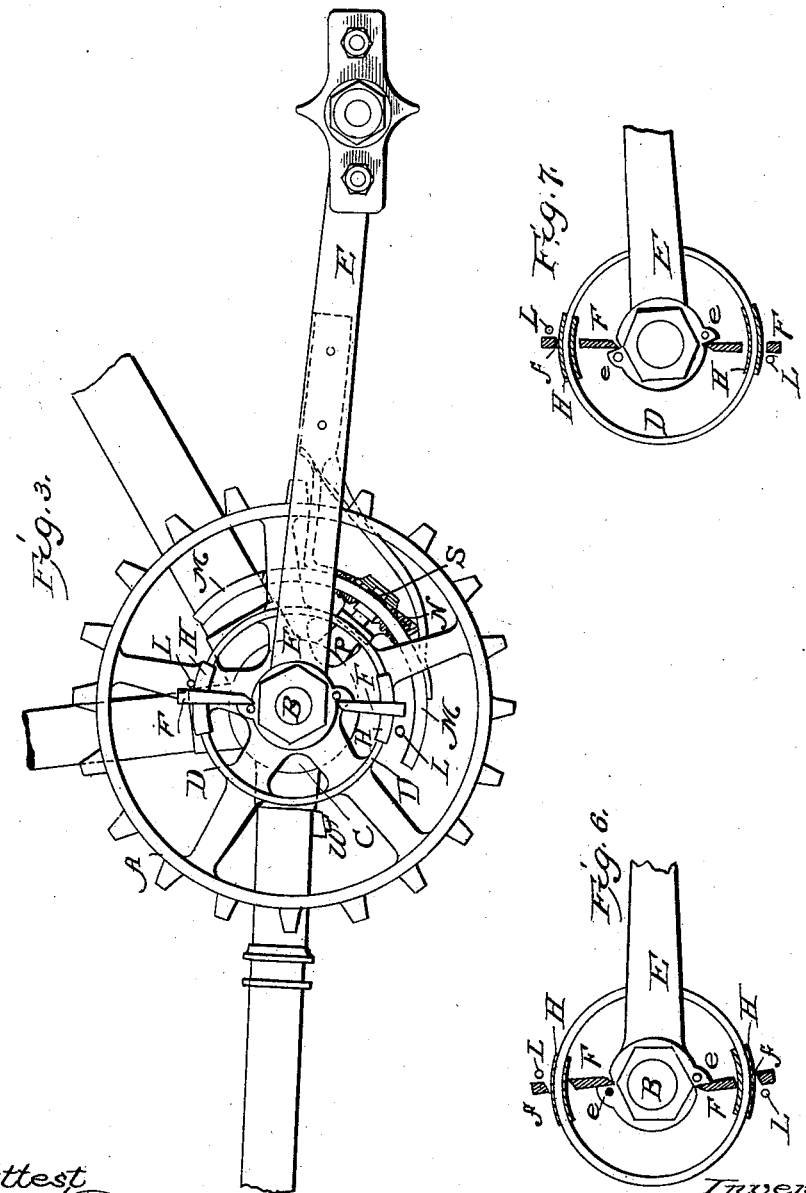

(No Model.) 3 Sheets—Sheet 3.
J. L. LÖB, G. H. BARLOW & A. W. R. DRABSCH.
BICYCLE DRIVING GEAR.
No. 599,106. Patented Feb. 15, 1898.
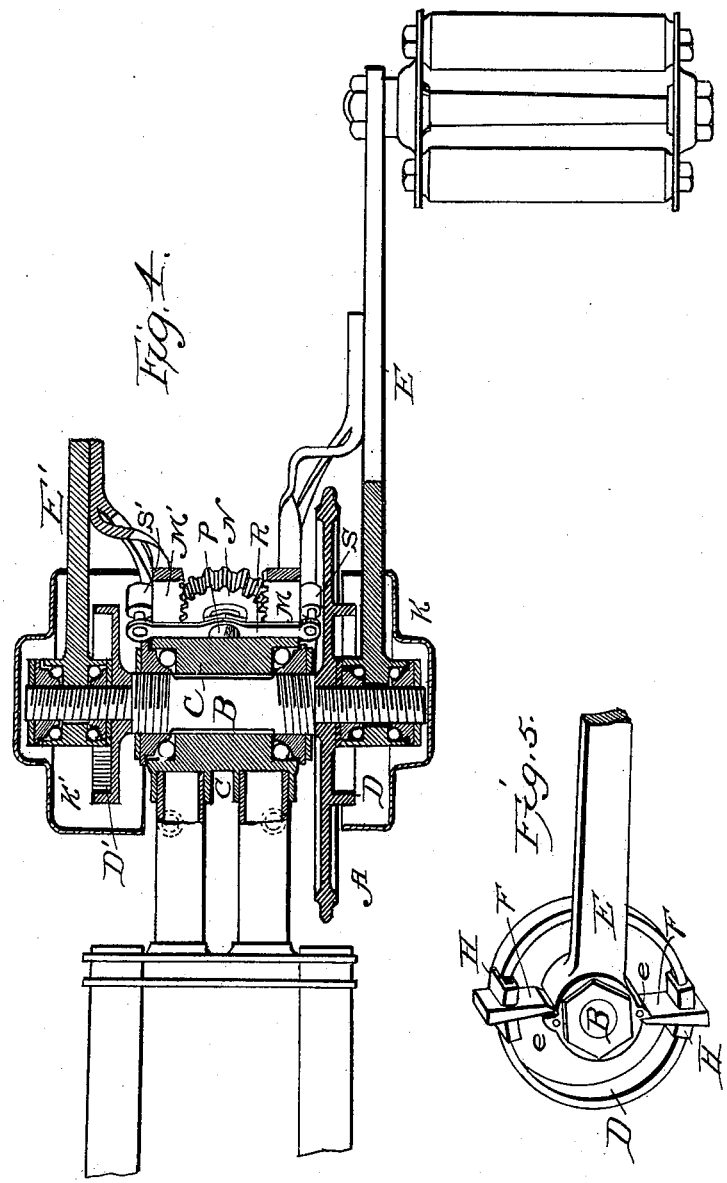
Attest
Waller Donaldson
C. S. Middleton
Inventors
Jacob L. Löb
Geo. H. Barlow
Adolph W. R. Drabsch
by Richards & Co. Attys.

UNITED STATES PATENT OFFICE.

JACOB LOUIS LÖB AND GEORGE HORNSBY BARLOW, OF ADELAIDE, AND ADOLPH WILHELM ROBERT DRABSCH, OF MANNUM, SOUTH AUSTRALIA.

BICYCLE DRIVING-GEAR.

SPECIFICATION forming part of Letters Patent No. 599,106, dated February 15, 1898.

Application filed October 3, 1896. Serial No. 607,780. (No model.) Patented in England September 28, 1896, No. 21,446.

*To all whom it may concern:*

Be it known that we, JACOB LOUIS LÖB and GEORGE HORNSBY BARLOW, machinists, residents of Rundle street, Adelaide, and ADOLPH WILHELM ROBERT DRABSCH, farmer, a resident of Main street, Mannum, in the Province of South Australia, subjects of the Queen of Great Britain, have invented a new and useful Improved Cycle or Velocipede Driving-Gear, of which the following is a specification.

The invention has been patented in England, No. 21,446, dated September 28, 1896.

The object of this invention is to provide an improved method of propelling cycles or velocipedes and of applying brake-power as and when required.

There have been many attempts to produce a machine in which the power shall be applied by working the feet with an up-and-down motion in place of rotary motion, but so far none of them have come into general use. Among the advantages of this means of propulsion are the following: Much longer pedal-levers may be used, giving a greater result either in speed or ease in proportion to the power expended. As there are no dead-centers, whatever position the pedal-levers are in upon power being applied to the upper one the machine will be driven forward. The seat may be placed farther forward, thus distributing the weight of the rider more equally between the two wheels.

In order that our invention may be clearly understood, we will describe the same with reference to the accompanying drawings.

Figure 1:
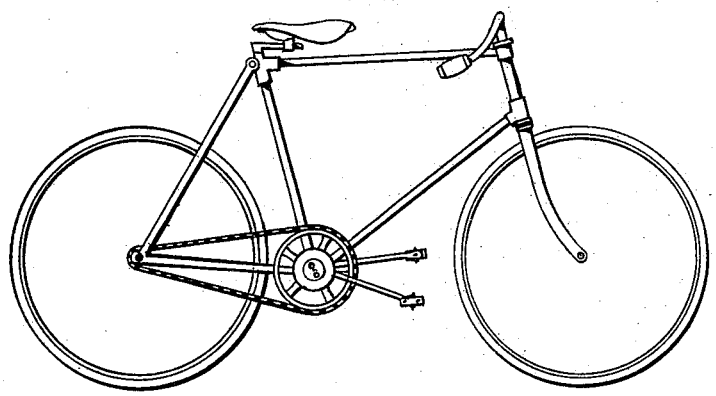
Figure 2:
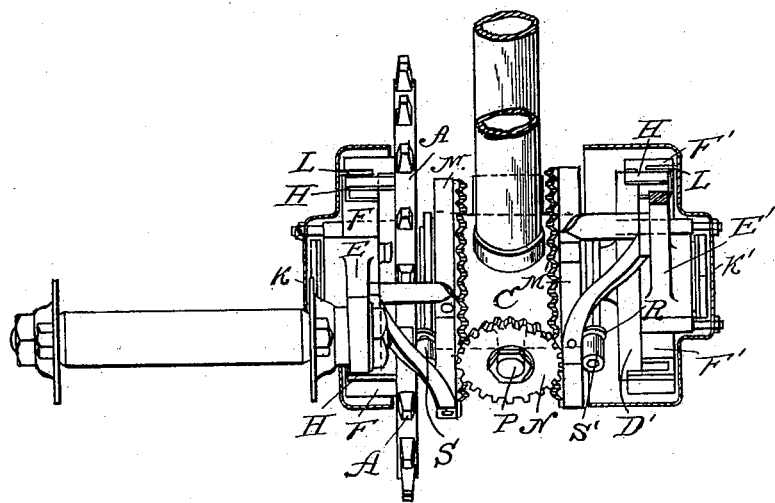

Figure 1 is a side view of a bicycle with our invention applied thereto. Fig. 2 is a front view with the cases K and K' in section and with the front portion of the left pedal-lever removed. Fig. 3 is a side view of portion of a bicycle, showing our invention. In this figure the left pedal and its attachments are omitted for the sake of clearness. Fig. 4 is a horizontal section at the center of the bottom bracket. Fig. 5 is a perspective view of the clutch mechanism on the right side of the machine. Figs. 6 and 7 are sectional views of the same. Fig. 6 shows the ring gripped by the clutches and wearing-plates, while Fig. 7 shows the ring released. In these two figures the clutches and wearing-plates are shown in section.

The large sprocket-wheel A, which is connected to the small sprocket-wheel on the driving-wheel by any suitable form of chain, is secured to the axle B, which is carried in the bottom bracket C by any suitable arrangement of ball-bearings. On the outside of the sprocket-wheel A is formed or secured a steel ring D, which is accurately turned. On the other side of the bottom bracket C a similar ring D' is secured to the axle B by means of a suitable boss and arms. The pedal-levers E E' are pivoted upon the ends of the axle B by ball-bearings. Each of the pedal-levers E and E' is provided with two clutches F F and F' F', respectively. One end of the clutch rests in a recess behind a shoulder $e$, formed in the boss of the pedal-lever, and near the other end is a notch $f$, which fits over the ring D. Between the faces of this notch and the ring is inserted a light steel wearing-plate H of U form. Upon the outside of each of the bosses of the pedal-levers are secured cases K and K', respectively. These serve as guards to inclose the clutches, and each carries two pins L L, one of which is placed slightly in front of each of the clutches. Upon the inner side of the pedal-levers are secured toothed quadrants M and M', respectively, both of which gear with a bevel-pinion N, which is fitted by ball-bearings upon a pin or stud P, projecting from the bottom bracket C. This stud also carries a cross-piece R, at the ends of which are studs or pins, upon which antifriction-rollers S and S' are journaled. These antifriction-rollers are situated just outside the backs of the toothed quadrants M and M'. In order to prevent the levers being accidentally depressed too far, buffers W are provided to receive the ends of the quadrants. Each of these buffers consists of a piece of rubber or spring supported in a suitable socket secured to the tubing of the machine.

We will first describe the action of the clutches, referring more particularly to Figs. 5 and 6. Upon pressure being put on the pedal E the shoulders $e\ e$ engage the inner ends of the clutches F, throwing them forward into the position shown in full lines. In this position it will be seen that the upper and lower parts of the U-shaped wearing-plate H are gripped together upon the outer and inner side of the ring D between the opposite edges of the notch $f$. The continued movement of the pedal-lever E will therefore carry the ring D with it. Upon the motion of the pedal being reversed the inner ends of the clutches are thrown backward, the clutches taking up positions similar to those shown in dotted lines, in which it will be seen that the edges of the notch $f$ do not press upon the U-shaped wearing-plate, and the ring is therefore free to revolve in a forward direction. The clutches are prevented from moving too far forward and binding in the opposite direction by the pins L L, which are carried by the case K.

The expressions "forward" and "backward" used above relate to the direction of rotation of the ring and sprocket-wheel.

The general operation of the machine is as follows: The pedal-levers being always ready for action the rider may mount the machine in any position without giving it any other start. He presses at once with his foot upon, say, the pedal on the lever E. This, as already described, causes the clutches F F and wearing-plates H H to engage the ring D. The ring D and the large sprocket-wheel A are thus rotated, and by means of a chain motion is communicated to the driving-wheel. As soon as the pedal-lever E has reached its bottom position the rider presses upon the other pedal-lever E', when a similar action takes place, the clutches F' F' and wearing-plates H' H' engaging the ring D' and thereby continuing the movement of the axle B, the sprocket-wheel A, and the ring D. As the one pedal-lever descends the other is raised by means of the quadrants M M' and bevel-pinion N. The antifriction-rollers S S' are a precaution against the quadrants being thrown out of engagement with the bevel-pinion by sudden shocks. As the pedal-lever is being raised its clutches are disengaged, as previously described, so that the ring on that side may rotate freely in a forward direction.

When it is desired to stop or brake the speed of the machine, it is only necessary to bring a slight pressure to bear on both the pedal-levers, and all of the clutches are caused to grip upon the rings, thereby retarding rotation.

The U-shaped wearing-plates H may be dispensed with, if desired, and the clutches allowed to bite direct onto the rings. In addition to the pins L L, projecting from the cases K and K', springs may be employed to further secure the action of the clutches.

Having now particularly described and ascertained the nature of our said invention and in what manner the same is to be performed, we declare that what we claim is—

1. In combination, the crank-shaft, the cranks, the sprocket-wheel, the clutches connecting the cranks therewith and means for connecting the cranks to move reversely said means consisting of the segments carried by the cranks and arranged between them and the pinion supported on the crank-hanger between the cranks and engaging said pinion, the said crank-axle extending through the crank-hanger, and said hanger being of the ordinary form with the pinion and segments located to one side of the same, and the said clutches being located at the ends of the crank-hanger and about the projecting ends of the crank, substantially as described.

2. In combination, the crank-shaft, the cranks, the driving connections including the clutches operated by the cranks, the segments attached to and arranged intermediate of the cranks, the pinion supported by the crank-hanger and engaging the segments and the antifriction-rollers bearing on the backs of the segments, substantially as described.

In testimony that we claim the foregoing as our invention we have signed our names, in presence of two witnesses, this 24th day of August, 1896.

JACOB LOUIS LÖB.
GEORGE HORNSBY BARLOW.
ADOLPH WILHELM ROBERT DRABSCH.

Witnesses:
CHARLES NICHOLAS COLLISON,
ARTHUR GORE COLLISON.